March 25, 1958     P. W. BLACKMER, JR     2,828,197

METAL BONDED DIAMOND WHEELS

Filed Sept. 15, 1954

Inventor
PAUL W. BLACKMER JR

By George Crompton
Attorney

2,828,197
METAL BONDED DIAMOND WHEELS

Paul W. Blackmer, Jr., Worcester, Mass., assignor to Norton Company, Worcester, Mass., a corporation of Massachusetts Application September 15, 1954, Serial No. 456,133

4 Claims. (Cl. 51—309)

The invention relates to metal bonded diamond wheels.

Objects of the invention are to provide superior diamond grinding wheels for glass grinding operations in general and specifically for the following operations:

Glass edging—the grinding of a smooth, rounded "crown" on the edge of plate glass, auto safety glass, mirrors and the like. This may be either a hand or an automatic operation, but in either case rate of cut is an important factor.

Glass bevelling—the grinding of a bevelled edge on plate glass (for shelving, display cases, etc.) or on mirrors. In this application not only is rate of cut important, but also finish—smoothness and absence of chipping.

Ophthalmic lens roughing operations—the generating of a curved surface in the first step after glass is cast into a rough blank. This is a high stock removal operation in which about 0.7 mm. of glass is removed. Time is not as critical since the machine on which the generator is mounted in production is only one of a series tended by one operator—and so long as the generator operates satisfactorily within a fixed cycle of, for example, 15 to 20 seconds, additional rate of cut is not necessary.

Lens generating for optical instruments—cameras, etc. In this application the rate of cut required may vary with individual production requirements, but as long as rate of cut is satisfactory for a multiple-station operation, it is generally less critical than is the surface finish.

Another object of the invention is to provide a superior bond for the manufacture of abrasive wheels which may in the future be found useful for many grinding operations other than those given above and which bond might also be used to bond abrasive material other than diamonds, for example fused aluminum oxide, silicon carbide or other hard carbides such as boron carbide and tungsten carbide.

Another object of the invention is to provide a metal bond formula of outstanding characteristics for the manufacture of solid abrasives. Recently some metal bonded silcon carbide abrasive wheels have been sold for use in the commercially new art of electrolytically assisted grinding. Other objects will be in part obvious or in part pointed out hereinafter.

In the accompanying illustrations which are photolithographic reproductions of photomicrographs of sections of sintered iron bronze specimens containing no diamonds or other abrasive with a magnification of 400×.

Figure 1:
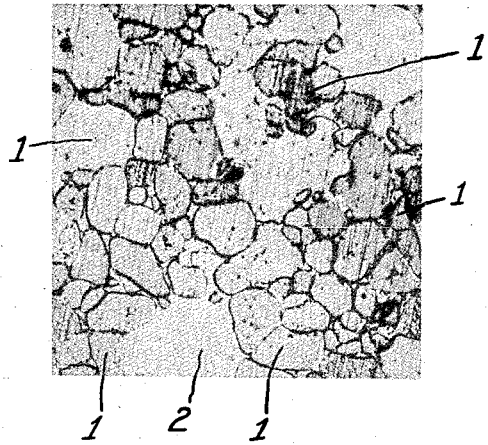
Figure 2:
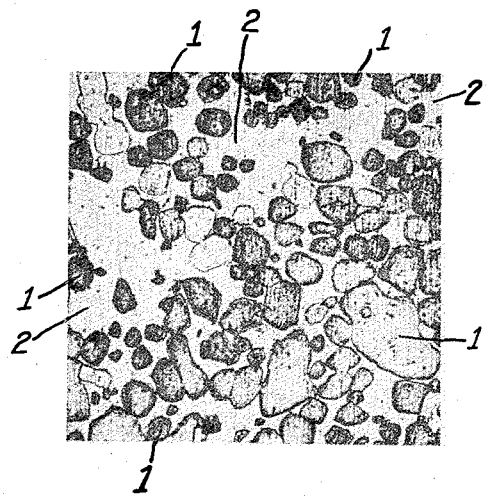
Figure 3:
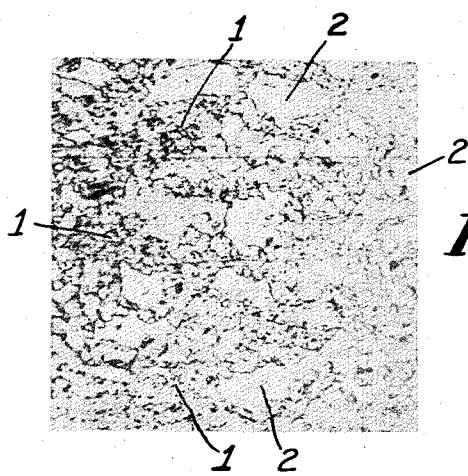

Figure 1 is the bond of the invention in its preferred form, 80% iron and 20% copper-tin bronze by weight, Figure 2 is the bond of the invention in its upper limit of bronze, to wit, 75% iron and 25% copper-tin bronze by weight, Figure 3 is 85% iron and 15% copper-tin bronze by weight having a bronze content just below the limits of the invention.

Wheels according to the invention are made by mixing metal powders with crushed diamond powder, charging the mixture into a mold, pressing, removing the pressed mixture from the mold which, because of the plasticity of metal holds its shape so that it can be handled, then firing to sinter the pressed mixture which is known as a green article. This technique is fully understood and has been explained in many patents and therefore I consider it is unnecessary to described it in detail herein.

Quite high pressures have customarily been used in the manufacture of metal bonded diamond wheels and I have used a pressure of 50 tons (100,000 pounds) per square inch which I find to be eminently satisfactory. I shall give no range of pressures to be used as I don't know the limits and while too low a pressure might give unsatisfactory results all persons skilled in the art will carry out this invention using a satisfactory pressure. As for the upper limit of pressure, no one knows what it is if there is any except for the limitations of the apparatus now available.

Wheels according to my invention can be of any desired size or shape. Almost all diamond abrasive wheels are composite, having an non-abrasive back or center. Known shapes are many and the commonest varieties are "straight," "cup," "flaring cup" and "segmented." Straight wheels are discs with a rim of diamond abrasive either one eighth, one sixteenth or one thirty-second of an inch in depth. Cup wheels are discs with an annulus projecting from one side which is flush with the periphery, and the side flat face of which is diamond abrasive to one of the above depths. Flaring cup wheels are hollow frusto-cones with a back at the small end and diamond abrasive of one of the indicated depths at the face which may be flat or beveled. Segmented wheels are made by soldering metal bonded diamond abrasive segments to the rim of a steel disc or to adaptors which are later secured to a steel disc. Of course the stated depths merely represent present commercial practice and my invention may be embodied in wheels having diamond abrasive of any desired depth.

The above description covers many present commercial products and my invention can be embodied in any thereof or in any future variety. Furthermore the technology of manufacture includes manufacture of the diamond abrasive rim or face separately and its subsequent attachment to the center or back and also the molding of the rim or face onto a center or back and the subsequent sintering thereof thereon. All of this technology is now so well known that it would be superfluous for me to describe any particular method of manufacture in detail as I may use any known procedure or future variation, since my invention is metal bonded abrasive as defined in the claims and I shall give the proportions of the elements and the preferred sintering temperature, which will enable anyone to put the invention into successful practical use. With regard to the proportion of diamond abrasive, I may use any practical proportion. Proportion of abrasive in an abrasive body is usually given in volume percentage because it is the percentage by volume and not by weight which is significant. Especially in the case of diamond abrasive articles the volume percentage proportion has varied widely but I can see little practical reason for having more than 50 volume percent of diamond abrasive in a metal bonded product although more than 50 volume percent of other kinds of abrasive has been used in some kinds of grinding wheels, even up to 70 volume percent. On the low side it is doubtful if a wheel containing less than 1 volume percent of diamond abrasive would be very useful but using fine grid even 1 volume percent of diamond would be significant. For example if the diamond is comminuted to 600 grit size (14 microns) the number of particles in a square inch is enormous being of the order of one hundred thousand. Such a wheel therefore would definitely abrade. Diamond abrasive has been used in wheels in sizes from 16 grid size to particles as small as one micron.

The metal bond according to the invention is from 17% to 25% bronze, the balance iron with normally expected impurities in each. The bronze should be alpha plus delta bronze and the alpha plus delta phase exists between 15.8% and 32.4% tin. All percentages in this specification are by weight excepting where volume percentage is specifically mentioned. More comprehensively my bond is sintered metal bond which by weight percentages is from 17% to 25% alpha plus delta bronze of copper alloyed with metal selected from the group consisting of tin, cadmium, zinc, aluminum, gallium and indium and mixtures thereof, said bronze being from 15% to 85% alpha bronze and from 85% to 15% delta bronze, the remainder of said sintered metal bond being ferritic iron limited to a maximum of 1% other elements and preferably limited to .15% carbon. The reason for the range 15 to 85 is because I have tried 17% tin bronze and this was marginal and just above this figure the delta phase is 15%. Furthermore I believe I need at least 15% alpha bronze to obtain the best results although this is necessarily somewhat an arbitrary matter since 100% delta bronze in the iron skeleton will give a wheel which will cut and probably will be superior to old wheels for some purposes. Nevertheless since apparently I have to establish a range, this is the best range that I can give.

The metals of the group given for alloying with the copper are the bronze and brass forming elements, bronze and brass belonging to the same family. When you add tin to copper it forms alpha bronze up to 15.8% of tin. Alpha bronze is copper with tin in solid solution—that is simply with copper atoms replaced with tin atoms. Above 15.8% tin, an additional phase forms, called delta bronze. The other metals listed also form a delta bronze type of structure, although other names may more commonly be used—notably in the case of brass. Since all of these combinations will, in proper proportions, form a brittle complex form similar in properties to delta copper-tin bronze however, I can for convenience refer to them collectively as delta bronze. Delta bronze is, in each of its varieties a compound of copper and one of the metals listed in which the ratio of valence electrons to atoms is 1.61 to 1. These compounds are $Cu_3Sn_8$, $Cu_5Zn$, $Cu_5Cd_8$, $Cu_9Al_4$, $Cu_8Ga_4$ and $Cu_9In_4$. At a certain percentage of the bronze forming element (32.4% in the case of tin) the bronze is all delta and so has no alpha and this all delta bronze is beyond the scope of my invention. Above this percentage other compounds are formed along with the delta bronze.

My diamond abrasive gives a rapid rate of cut together with a uniform surface finish, both of which characteristics are highly desirable in glass grinding wheels. The iron forms a porous iron skeleton the pores of which are filled with the bronze defined which is brittle. I have found that the iron and the bronze coact to give the freedom of cut of bronze bonded wheels without impairment by the iron skeleton and that the iron gives a wear resistance without impairment by the bronze so that the remarkable result of a fast rate of cut and extremely long life is achieved.

I prefer to use pre-alloyed bronze which is powdered and then mixed with the iron. However, I can use with comparable results separate powders of copper and tin or alternative bronze forming element and, of course, iron. The iron is preferably electrolytic iron.

In the illustrations the separate phases of iron 1 and bronze 2 are clearly discernible. The iron particles 1 appear to be sintered together only at small spots so that the iron forms a truly skeletal structure filled with bronze particles. There is of course some alloying of the two phases but it is slight. It is the friable and somewhat weak character of the iron skeleton which probably maintains the free cutting characteristic of the alpha plus delta bronze which is quite free cutting while at the same time for some reason not altogether clear, the iron, though skeletal, gives remarkable resistance to wear. In referring to a bond as "free cutting" I of course mean that the abrasive is free cutting when bonded with such a bond.

Figure 1 shows a well developed structure in which the dark areas represent the iron particles 1 sintered together leaving large voids in which (the light areas) are the bronze particles 2. Figure 2 shows the iron particles 1 as free floating in an area of bronze 2 but there is just enough bonding of the iron particles to give the wheels a good life and they are, of course, free cutting. In Figure 3 the spotty continuous darker areas are the iron particles 1, and the lighter colored areas are the bronze particles 2. Wheels bonded with this bond are somewhat too hard acting (opposite to free cutting). The 75% iron 5% bronze, by volume, wheels last longer than most prior wheels and are freer cutting than my preferred wheels, all according to tests which I have made grinding glass with these wheels.

The alpha plus delta bronze has free cutting characteristics and is a friable bronze. The reason for the range of from 17% to 25% bronze is because the free cutting characteristics falls off rapidly below 17%. The reason for the upper limit 25% bronze is that above that figure the pieces are found to be blistered or distorted somewhat.

My preferred formula is 80% reduced iron powder and 20% pre-alloyed bronze powder containing 81.5% copper and 18.5% tin. This is the best formula now known to me. the best sintering temperature known to me is 805° C. The iron becomes ferric (alpha) iron. In my preferred formula there was no appreciable percentage of carbon but any carbon present would form cementite and not graphite. Cementite is generally considered to be $Fe_3C$ and of course is the steel making carbide. As aforesaid if there is any thereof it should be limited to .15% carbon occurring as cementite but figured on the carbon content.

The alpha plus delta bronze starts to fuse at 798° C. according to investigators and the sintering temperature should be at least as high as this fusion temperature. However, since at this temperature errors of a few degrees centigrade are not uncommon, I will put the minimum sintering temperature at 795° C. Actually I prefer a temperature of 805° C.

The alpha plus delta bronze is completely fluid at 900° C. and this sets the upper limit of the sintering temperature with the same proviso that as there may be slight error in the reports of investigators I set it at 905° C. When the alpha plus delta bronze is completely fluid it will start to flow out of the iron skeleton and may also cause distortion. Therefore there are definite reasons for the given range of firing temperatures to sinter the bond. The above figures are for the copper-tin bronze and the specific figures for the other bronzes can be developed by those skilled in the art. Two requirements must be met. There must be sufficient sintering of the iron powder to form the sketal structure and the temperature must be sufficiently high to melt the bronze partially. If, owing to the lower melting point of some of the other bronzes, it becomes necessary to use a lower or higher sintering temperature than the range described, it will be apparent to those skilled in the art. The particular alpha plus delta bronze dealt with in the above discussion is the one I prefer namely the one having 18.5% tin and other alpha plus delta tin bronzes have other fusing ranges.

At the plant of one lens manufacturer, a lens generator made in accordance with my invention was tested against a number of others one of which was the standard bronze bonded diamond abrasive lens generator which has been satisfactorily used for many years. This standard bronze bonded lens generator, a diamond abrasive wheel, is bonded with sintered bronze bond of the composition 18.5% tin, the balance copper. At the plant of this lens manufacturer, lens blanks, pressed from semi-molten glass slugs, are ground in what is actually the first stage of the production cycle.

The generator, grinding wheel, according to my invention was made in accordance with the preferred parameters herein before given. This is true of the generator tested at the plant of this lens manufacturer, hereinafter identified as manufacturer A, as well as of those wheels tested at the plants of other manufacturers as hereinafter described. Thus the wheels according to the invention were bonded with 20% bronze, the balance iron, and the bronze was 81.5% copper and 18.5% tin, pre-alloyed before mixing with the iron which was electrolytic iron powder. The sintering temperature was 805° C.

The generator according to my invention tested at the plant of manufacturer A and all the others tested were of the convex type, all having 120 grit size diamond in concentration of just under 25 volume percent. All the generators had metal bonded diamond abrasive of one sixteenth inch depth. All the generators, all of them being metal bonded diamond abrasive wheels, were tested on a fixed cycle during which 0.7 millimeter of glass was removed. Wheel efficiency was measured by the ratio of stock removed to wheel worn away, volumetrically. Surface finish was measured and reported in root-mean-square microinches. The ease of cutting was measured by the current in miliamperes in one phase of the wheel motor, the ease of cutting being of course the reciprocal of the values given. No definite upper limit was set but a current drain of over 600 milliamperes was regarded as excessive and less breakage generally resulted. A range of from 200 to 400 miliamperes was regarded as excessive and lens breakage generally re- was that of the customer. The particular composition of the metal bond is indicated in the following table by atomic and molecular symbols of the elements. The results at the plant of manufacturer A of this test were as follows:

Table I

| Wheel No. | Metal Bond Composition | Cubic Inches of Glass Removed per Cubic Inch of Wheel Wear | RMS, Micro-Inches | Current (milliamperes) |
| --- | --- | --- | --- | --- |
| 1 | 80% Fe, 20% Bronze of 18.5 Sn, 81.5 Cu. | 87,230 | 47-67 | 296. |
| 2 | 81.5% Cu, 18.5% Sn (Standard Bronze). | 27,490 | 50-70 | 217. |
| 3 | | 270,633 | 38-58 | 790 (excessive). |
| 4 | | 142,850 | 41-60 | 613 (excessive). |
| 5 | | 32,556 | 56-76 | 245. |
| 6 | | 32,262 | 46-66 | 640 (excessive). |
| 7 | | 6,591 | 54-74 | 620 (excessive). |

Wheel No. 1 is the wheel of the invention. Wheel No. 2 is a standard bronze bonded diamond wheel of a formula used for years by my assignee and by which thousands of wheels have been made and sold for many grinding operations including glass grinding of all the types dealt with herein. I was of the opinion that the deficiency of this wheel for glass grinding operations was due to the fact that it was soft acting, soft and hard acting being expressions well understood in the abrasive industry. Therefore I tested a wheel of subject invention against a standard wheel No. 2 and against other wheels ranging in hardness from slightly softer than wheel No. 2 to very much harder, these being wheels 3 to 7 inclusive of Table I and each of these wheels 3 to 7 inclusive differs from all of the others in hardness of acting. As each of wheels 3 to 7 inclusive is outside of the scope of this application and as each of them is subject to further development and as none of them were invented by me, I deem it inappropriate to give the bond formulae of any of them. In the tests reported in Table I all the generators were of the same size and shape.

Another manufacturer of lenses, identified as manufacturer B, has used lens generators manufactured according to the preferred form of my invention which were of the concave type two inches in diameter, seven eighths inch thick with a one and five eighths inch central hole having a one quarter inch diamond depth having 400 grit size diamond in concentration just below 25 volume percent. These lens generators according to the invention were reported to have finished over one hundred thousand surfaces whereas with similar lens generators of the same size and shape and diamond depth bonded with 81.5% Cu, 18.5% Sn, the standard bronze and being composition of No. 2 of Table I, usually not over twelve thousand surfaces could be finished. Rate of cut was not reported but for a generator to remain in production, rate of cut must be satisfactory. Lens generators according to my invention have been many weeks in use in the plant of manufacturer B and are still in use there.

I had many other reports from many other manufacturers indicating superiority of my diamond wheels especially for the manufacturing operations involving the grinding of glass as explained at the beginning of this specification and in every case the wheels of my invention were preferred to all other metal bonded diamond wheels for these operations but not all of the statistics and parameters were reported. Manufacturer C edging one quarter inch thick plate glass in an automatic operation reported generally that wheels according to the preferred form of my invention reduced the cost of edging the glass to 1/2.6 of the previous cost using metal bonded wheels of another diamond abrasive wheel manufacturer not completely identified but previously preferred by manufacturer C. No adverse report on the wheels of my invention for the manufacturing operations indicated have been received.

It will thus be seen that there has been provided by this invention metal bonded diamond wheels in which the various objects hereinabove set forth together with many thoroughly practical advantages are successfully achieved. As many possible embodiments may be made of the above invention and as many changes might be made in the embodiments above set forth, it is to be understood that all matter hereinbefore set forth is to be interpreted as illustrative and not in a limiting sense.

I claim:

1. Metal bonded diamond abrasive comprising crushed diamond in amount from 1 volume percent to 50 volume percent bonded with sintered metal bond which by weight percentages is from 17% to 25% alpha plus delta bronze of copper alloyed with metal selected from the group consisting of tin, cadmium, zinc, aluminum, gallium and indium and mixtures thereof, said bronze being from 15% to 85% alpha bronze and from 85% to 15% delta bronze, the remainder of said sintered metal bond being at least 99% ferritic iron limited to a maximum of .15% carbon, said ferritic iron having a porous skeleton form the pores of which are filled with the bronze which is brittle.

2. Metal bonded abrasive comprising comminuted abrasive bonded with sintered metal bond which by weight percentages is from 17% to 25% alpha plus delta bronze of copper alloyed with metal selected from the group consisting of tin, cadmium, zinc, aluminum, gallium and indium and mixtures thereof, said bronze being from 15% to 85% alpha bronze and from 85% to 15% delta bronze, the remainder of said sintered metal bond being at least 99% ferritic iron limited to a maximum of .15% carbon, said ferritic iron having a porous skeleton form the pores of which are filled with the bronze which is brittle.

3. Metal bonded diamond abrasive according to claim 1 in which the metal selected from the group is tin.

4. Metal bonded comminuted abrasive according to claim 2 in which the metal selected from the group is tin.

References Cited in the file of this patent

UNITED STATES PATENTS

| | | |
|---|---|---|
| 2,137,329 | Boyer et al. | Nov. 22, 1938 |
| 2,434,314 | Felker | Jan. 13, 1948 |
| 2,506,556 | Ball et al. | May 2, 1950 |
| 2,609,285 | Thomas | Sept. 2, 1952 |

U. S. DEPARTMENT OF COMMERCE
PATENT OFFICE

CERTIFICATE OF CORRECTION

Patent No. 2,828,197    Paul W. Blackmer, Jr.    March 25, 1958

It is hereby certified that error appears in the printed specification of the above numbered patent requiring correction and that the said Letters Patent should read as corrected below.

Column 2, lines 59 and 66, for "grid", each occurrence, read --grit--; column 3, line 38, for "$Cu_8Ga_4$" read --$Cu_9Ga_4$--; column 4, line 9, for "5% bronze" read --25% bronze--; line 23, for "the best" read --The best--; column 5, line 26, for "regarded as excessive and lens breakage generally re- read --regarded as ideal and in this as in other cases the opinion--.

Signed and sealed this 10th day of June 1958.

(SEAL)
Attest:
KARL H. AXLINE
Attesting Officer

ROBERT C. WATSON
Commissioner of Patents